Nov. 26, 1963 — L. G. LAKIN — 3,111,742
DISC CONSTRUCTION FOR ROLLS
Filed Dec. 18, 1961

INVENTOR.
Lewis G. Lakin
BY Snow and Benne
Attys.

United States Patent Office 3,111,742
Patented Nov. 26, 1963

3,111,742
DISC CONSTRUCTION FOR ROLLS
Lewis G. Lakin, Skokie, Ill., assignor to A. Lakin & Sons, Inc., a corporation of Illinois
Filed Dec. 18, 1961, Ser. No. 160,039
8 Claims. (Cl. 29—125)

This invention relates to a new and improved disc forming part of a roll which is of a type used in agricultural machinery.

Rolls such as those shown in the Siemen Patents 2,416,123 and 2,416,124 are used in agricultural machines to husk corn, to condition hay, to pitch bales and to accomplish many other functions. These rolls are made of a laminate of discs cut from tire casings. The discs are reinforced with synthetic or natural fibers thereby making the roll long-wearing and resistant to abrasion. The uses to which rolls of this type are put encompass many and varied conditions. Some of the rolls are run at very high speeds while other such rolls might be run at relatively slow speeds but having great loads imposed thereon.

In view of the fact that the rolls are made up of a plurality of parts it is a necessity that the parts be made in such a manner that upon assembly and use the resultant roll functions as an integral unit. It is with this particular phase that the present invention is concerned. Laminated rolls are made by placing a number of discs on a supporting shaft. The discs are then placed under endwise compression generally causing them to adhere to the shaft and to each other. In such a construction and in certain uses some of the discs tend to have separate rotation and become eccentric one to the other. For these and other reasons cooperative keys and key slots are used between the shaft and the discs. Even with this precaution certain of the discs would tend to stretch about the key slots and cause disc distortion about the supporting shaft. The position of the key slots in relation to the fibers in the layers or plies of fiber impregnated rubber is extremely important.

A principal object of this invention is to provide a roll usable in agricultural machines and constructed of a plurality of fiber impregnated rubber discs.

An important object of this invention is the provision of a roll of laminated discs cut from tire casings.

An important object of the present invention is to provide a roll composed of a shaft and a plurality of side-by-side discs mounted on the shaft and the discs constructed to uniformly hug the shaft regardless of the speed of rotation of the roll or the use to which the roll may be put.

Other and further important objects and advantages will become apparent from the disclosures in the following specification and accompanying drawings.

Figure 1:
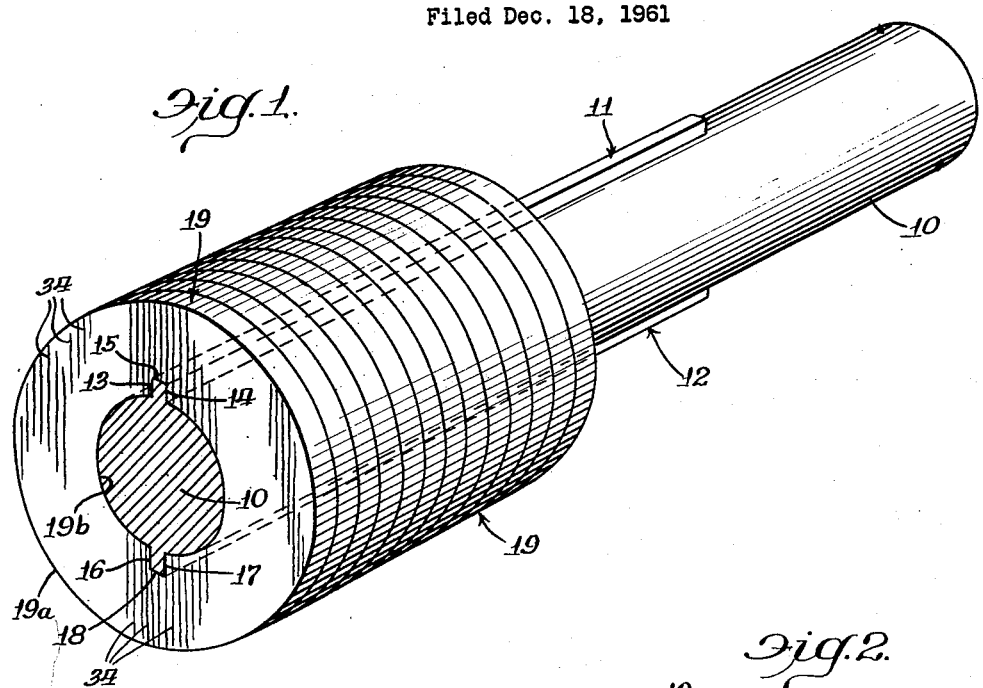
FIGURE 1 is a perspective view of a portion of a roll constructed with the particular discs of this invention.

The reference numeral 10 indicates generally a shaft on which the discs of this invention are mounted to form a roll. In this instance the shaft is cylindrical in shape and includes generally longitudinally extendings keys 11 and 12. The keys 11 and 12 are disposed on diametrically opposed sides of the elongated shaft 10. More particularly the keys 11 and 12 are generally rectangularly shaped. The key 11 includes spaced apart parallel sides 13 and 14 extending generally radially outwardly from the circumference of the shaft 10. The key 11 also includes a top 15 disposed at right angles to the parallel sides 13 and 14. The key 12 is similarly provided with parallel sides 16 and 17 which are diametrically opposed to the sides 13 and 14 of the key 11. A top 18 constitutes an enclosure for the key 12 and is positioned at right angles to the parallel sides 16 and 17.

The roll of this invention includes a plurality of discs 19 mounted over the shaft 10 and held on the shaft under endwise compression by means not shown herein. For the details of construction as to the means for holding the discs under endwise compression on the shaft attention is invited to applicant's copending application entitled Tire Carcass Disc for Rolls, Serial No. 142,794. As stated previously in this specification rolls made from the discs of this invention are employed in various farm machines. The rolls are used to husk corn, to condition hay, to propel bales of hay and for various other functions. In all of these instances it is desirable that the roll have great strength and resist abrasion. With such requirements the farm implement designer might believe that a roll made of one of the hard metals or metal alloys would be most desirable. However, in the uses mentioned above it is a further requirement that the roll have a resilient characteristic which of course is not available in metals. It has been found that fiber impregnated rubber and more particularly the fiber impregnated rubber of tire casings such as disclosed in the earlier Siemen Patents 2,416,123 and 2,416,124 are very desirable for roll construction. More particularly, discs cut from the tread portion of tire casings insure that the fibers within the discs come to the circumference of the discs and thereby give the resultant roll long-wearing characteristics and aggressive resilient action in performing the task to which it is put.

The discs cut from tire casings are commonly referred to as tire carcass discs. As shown in both of FIGURES 1 and 2 the discs 19 are cut with an outer circular surface 19a and an inner central or center opening having a circular surface 19b. The circles 19a and 19b are preferably concentric. The center opening 19b permits mounting of the discs 19 onto the shaft 10 which has a similar circular shape. The size of the central opening 19b is of slightly less diameter than the diameter of the shaft 10 on which the disc is mounted. It is therefore obvious that the discs must be somewhat stretched in order to mount them on the larger shaft and secure a snug fit.

The central opening 19b of the discs 19 are equipped with generally radially disposed, diametrically opposed key slots 20 and 21. It is preferable that the key slots be similar in shape to the keys over which they are to be mounted and carried by the shaft 10. In this instance the key slots 20 and 21 are generally rectangular in shape. The slot 20 is equipped with spaced apart, substantially parallel side walls 22 and 23 which extend generally radially outwardly from the center of the disc 19. The right angle top of the slot shown at 24 joins the sides 22 and 23. Similarly the diametrically opposed key slot 21 is provided with spaced apart, substantially parallel sides 25 and 26 joined by a right angle top 27. The key slots 20 and 21 are thus cut radially outwardly into the disc 19 from the inner opening circumference 19b as clearly shown in FIGURE 2. The relative sizes of the key slots and the keys on which the discs are mounted is important to the functioning of the rolls made with the discs of this invention. It should be understood that the width of the key slots 20 and 21 is slightly less than the width of the keys 11 and 12. Further the depth of the key slots 20 and 21 is substantially the same or somewhat greater than the height of the keys 11 and 12. Thus when the key slotted discs 19 are mounted onto the shaft with its generally longitudinally extending diametrically opposed keys 11 and 12 there is a stretching of each disc at its inner circumference 19b at its key slots 20 and 21. The key slots are required to pass over the wider yet substantially the same or slightly lesser height keys. Ordinarily the snug fit of an inner opening onto a shaft is sufficient to prevent relative rotation of the shaft and disc. Also, the snug fit and the endwise compression of the discs on a shaft are normally sufficient to prevent relative rotation of adjacent discs. However, under the extreme service conditions in which the rolls are used it is desirable to employ cooperative key and key slot means to positively hold the component parts of the roll together as an operating unit.

The inherent construction of tire casings is utilized in the present invention. A tire casing is made up of a plurality of plies of fiber impregnated rubber. Fibers whether natural or synthetic are laid in parallel relationship and coated with a rubber latex thus constituting one ply for a tire casing. A number of such plies are similarly made all of which contain only parallel fibers. The plies thus constitute a weftless fabric. These plies are then vulcanized together to form a casing body. In the compilation of plies going in to make a tire casing adjacent plies are preferably arranged such that the parallel fibers of each ply are disposed at some acute angle relative to each other. This angle is approximately 60°. The fibers of alternate plies of the casing contain parallel fibers. Thus the fibers in the casing usually run in only two directions. Approximately half of the fibers are disposed in one direction and all of these fibers are parallel one to another. Similarly the fibers of intermediate alternate plies are all parallel one to another but are disposed at an angle of approximately 60° with respect to the first named ply fibers.

Figure 2:
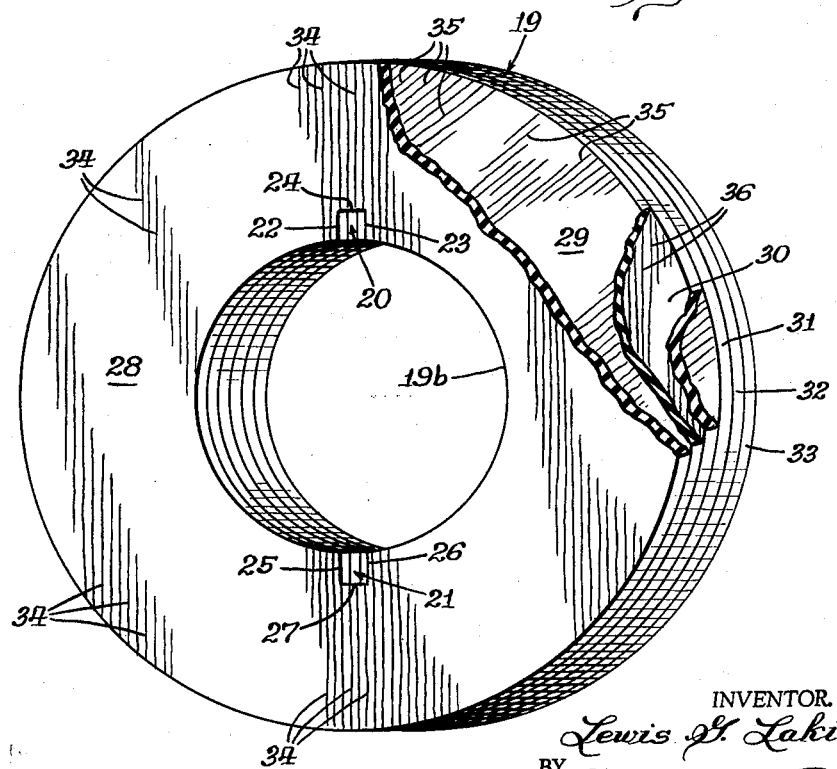
FIGURE 2 is an enlarged detail perspective view of one of the discs of this invention and including portions of several plies broken away to show interior construction.

The enlarged disc of FIGURE 2 is employed to show the plurality of plies from which the casing is constructed. The number of plies shown is not necessarily representative of any standard number of plies but rather the tires from which the discs are cut may contain any number of plies. The manufacturer of the discs can split the tire carcass material to any desired thickness and/or number of plies. As best shown in FIGURE 2 the disc 19 includes a plurality of fiber impregnated rubber plies 28, 29, 30, 31, 32 and 33. Even though the fibers are preferably covered with a rubber or rubber latex the disposition of the fibers within the ply is generally visible to the eye. The fibers in the ply 28 are shown at 34 and are generally parallel to the sides 22 and 23 of the key slots 20 and are similarly parallel to the sides 25 and 26 of the key slots 21. It is this particular orientation of key slots to fiber disposition that causes the discs to further adhere and snugly engage or hug the shaft 10 around its full circumference. In the event the key slots are not rectangularly shaped and do not have parallel sides then the disposition of the fibers would be described as being generally parallel to a radius of the disc passing through the key slot. It is a particular requirement of the present invention to have the fibers of a substantial number of the plies arranged so that the fibers extend generally radially outwardly from the tops of the key slots 24 and 27 to the outer circumference 19a of the disc. The disposition of the fibers 34 minimizes the chances of collapse of the disc through this distance between the key slot and the outer circumference and thus prevents undesirable spreading of the inner circumference 19b in anything but a uniform extension around the shaft 10. The ply 29 immediately behind the top ply 28 is provided with a plurality of parallel fibers 35 but the fibers 35 are disposed at an angle of approximately 60 degrees relative to the fibers 34 of ply 28. Similarly the next succeeding ply 30 as shown in FIGURE 2 has a plurality of parallel fibers 36 which are in turn parallel to the fibers 34 of the top or alternate ply 28. Thus a substantial number of all of the constituent fibers in the tire carcass material are disposed at the position of the key slots in a generally parallel relationship to a radius of the disc passing through the key slots.

The orientation of the fibers within the tire casing material, from which the discs are cut, relative to the key slots is a principal factor in maintaining concentricity of all of the outer circumferences 19a of the plurality of discs relative to the circumference of the shaft 10. It has been found that when the key slots 20 and 21 are cut radially outwardly into the disc 19 from the center opening 19b into the crossed fibers of adjacent plies so that both sets of parallel fibers are disposed at an acute angle relative to the sides of the key slots the scissorslike folding of the fibers of adjacent plies permits an undue spreading of the disc at the point of the keys such that other portions of the inner circumference 19b become spaced from the surface of the shaft 10 thus causing out-of-round conditions of the discs. If this undesirable condition were to be remedied by turning down the entire cylindrical roll the result would undoubtedly be a complete unbalancing of the roll. In such a situation there is likely to be an inward collapse of certain of the discs which were initially caused to be unnaturally spread from the shaft. Such a happening again produces an out-of-round roll which is inoperative for most jobs. With a substantial number of the fibers disposed parallel to the key slots at the location of the key slots the discs have a tendency to maintain contact of the inner circumference 19b against the shaft at all points around the shaft. It is this feature that results in balanced rolls.

In the operation of the device of this invention a plurality of discs 19 having key slots cut radially outwardly from a central opening with the fibers of alternate plies disposed generally parallel to a radius of the disc at the location of the key slots are mounted onto a relatively larger shaft 10 such that the discs are stretched in the mounting and then placed under endwise compression on the shaft. The cooperative keys and key slots prevent relative rotation of the discs with respect to each other and also with respect to the shaft. The snug fit of the discs on the shaft and the orientation of the fibers keep the discs in hugging relationship on the shaft entirely around the circumference thereof. The resultant rolls are naturally balanced and operate as an integral unit of all of the component parts thereof. It should be understood that the size and shape of the keys and key slots may be changed without departing from the teachings of this invention. However, the keys and key slots as shown are the preferable forms thereof. Primarily it is the disposition of a substantial number of the tire casing fibers that contributes to the proper fitting of the discs on the shaft and the maintenance of the discs in proper position and relative relationship thereon.

I am aware that numerous details of construction may be varied throughout a wide range without departing from the principles disclosed herein and I therefore do not intend limiting the patent granted hereon otherwise than as necessitated by the appended claims.

What is claimed is:

1. A roll for use in agricultural machines comprising, a generally cylindrical shaft having key means extending generally longitudinally thereof, a plurality of discs cut from fiber impregnated rubber tire casings, each of said discs comprising a plurality of plies with a substantial number of said plies having a plurality of fibers disposed in parallel relationship, each of said discs having a circular center bore and keyway means extending generally radially into the disc from the center bore thereof along lines parallel to said plurality of fibers, said plurality of discs mounted in face-to-face condition on said shaft by their respective bores and with said keyway means entered by said key means.

2. In a roll as defined in claim 1, wherein the respective bores and keyway means of said discs are less in size than the size of said shaft and said key means when said discs are free from said shaft and in a relaxed condition so that said discs hug said shaft.

3. A roll for use in agricultural machines comprising, a generally cylindrical shaft having key means extending generally longitudinally thereof, a plurality of discs cut from fiber impregnated rubber tire casings, each of said discs comprising a plurality of plies, each of said plies comprising a plurality of fibers disposed in parallel relationship, said plurality of plies of each disc being arranged so that the parallel fibers of alternate plies are disposed in parallel relationship, each of said discs having a circular center bore and keyway means extending generally radially into the disc from the center bore thereof along lines parallel to the parallel fibers of said alternate plies, said plurality of discs mounted in face-to-face condition on said shaft by their respective bores and with said keyway means entered by said key means.

4. In a roll as defined in claim 3, wherein said key means comprises a pair of diametrically disposed keys, and said keyway means comprises a pair of diametrically disposed keyways.

5. In a roll as defined in claim 4, wherein the respective bores and keyways of said discs are less in size than the size of said shaft and said keys when said discs are free from said shaft and in a relaxed condition so that said discs hug said shaft.

6. In a roll as defined in claim 3, wherein said key means comprises a key substantially rectangular in cross section, and each of said keyway means comprises a substantially rectangular keyway.

7. In a roll as defined in claim 6, wherein the width of said key is greater than the corresponding width of each of said keyways when said discs are free from said shaft and in a relaxed condition.

8. In a roll as defined in claim 7, wherein the size of said shaft is greater than the size of each of said bores when said discs are free from said shaft and in a relaxed condition.

References Cited in the file of this patent

UNITED STATES PATENTS

| | | |
|---|---|---|
| Re. 13,127 | Perkins | July 5, 1910 |
| 2,773,300 | Clements | Dec. 11, 1956 |
| 3,008,219 | Sammarco | Nov. 14, 1961 |